United States Patent
Miquee et al.

(10) Patent No.: US 11,436,121 B2
(45) Date of Patent: Sep. 6, 2022

(54) MONITORING SYSTEM FOR SUPERCOMPUTER USING TOPOLOGICAL DATA

(71) Applicant: BULL SAS, Les Clayes sous Bois (FR)

(72) Inventors: Sébastien Miquee, Arpajon (FR); Ravaka Andriambelo Razafiarison, Arpajon (FR); Ben Bratu, Versailles (FR)

(73) Assignee: BULL SAS, Les Clayes Sous Bois (FR)

( * ) Notice: Subject to any disclaimer, the term of this patent is extended or adjusted under 35 U.S.C. 154(b) by 355 days.

(21) Appl. No.: 15/752,486

(22) PCT Filed: Jul. 19, 2016

(86) PCT No.: PCT/FR2016/051861
§ 371 (c)(1),
(2) Date: Feb. 13, 2018

(87) PCT Pub. No.: WO2017/025672
PCT Pub. Date: Feb. 16, 2017

(65) Prior Publication Data
US 2019/0012253 A1    Jan. 10, 2019

(30) Foreign Application Priority Data
Aug. 13, 2015    (FR) ...................... 1557708

(51) Int. Cl.
*G06F 11/34* (2006.01)
*G06F 11/30* (2006.01)
*G06F 11/32* (2006.01)

(52) U.S. Cl.
CPC ...... *G06F 11/3495* (2013.01); *G06F 11/3006* (2013.01); *G06F 11/3024* (2013.01);
(Continued)

(58) Field of Classification Search
CPC ............ G06F 11/3495; G06F 11/3024; G06F 11/3006; G06F 11/3082; G06F 11/3089; G06F 11/323; G06F 11/328
(Continued)

(56) References Cited

U.S. PATENT DOCUMENTS 8,522,248 B1 * 8/2013 Nair ...................... G06F 9/5027
718/104
11,165,659 B2 * 11/2021 Vigneras ................. H04L 41/20
(Continued)

FOREIGN PATENT DOCUMENTS

EP    2267940 A1    12/2010
JP    2013054402 A    3/2013
(Continued)

OTHER PUBLICATIONS

Definition of topology, Web Dictionary, printed Dec. 20, 2020. (Year: 2020).*
(Continued)

*Primary Examiner* — Michael P Nghiem
(74) *Attorney, Agent, or Firm* — Meagher Emanuel Laks Goldberg & Liao, LLP

(57) ABSTRACT

Some embodiments are directed to a monitoring system for monitoring a supercomputer architecture including a plurality of devices, including an events analysis module adapted for the reception of an event relating to probes associated with these devices and for the determination of items of information on at least one device as a function of data contained in the event; an information aggregation module adapted to determine second items of information on the basis of these items of information, and as a function of data on the topology of the architecture of the supercomputer; and an information transmission module, adapted for the
(Continued)

transmission of the second items of information to at least one supervision data viewing tool.

4 Claims, 1 Drawing Sheet

(52) U.S. Cl.
CPC ...... *G06F 11/3082* (2013.01); *G06F 11/3089* (2013.01); *G06F 11/323* (2013.01); *G06F 11/328* (2013.01); *G06F 2201/86* (2013.01); *G06F 2201/88* (2013.01)

(58) Field of Classification Search
USPC ......................................................... 702/186
See application file for complete search history.

(56) References Cited

U.S. PATENT DOCUMENTS

| | | | | |
|---|---|---|---|---|
| 2010/0322237 | A1* | 12/2010 | Raja | H04L 43/02 370/389 |
| 2013/0238795 | A1* | 9/2013 | Geffin | G06F 1/206 709/224 |
| 2015/0052441 | A1 | 2/2015 | Degioanni | |
| 2016/0020965 | A1* | 1/2016 | Sakata | G06F 11/3495 714/4.12 |
| 2017/0085435 | A1* | 3/2017 | Vigneras | H04L 41/20 |
| 2017/0091000 | A1* | 3/2017 | Miquee | G06F 11/079 |

FOREIGN PATENT DOCUMENTS

| | | |
|---|---|---|
| WO | WO2012/047757 A1 | 4/2012 |
| WO | WO2015/020648 A1 | 2/2015 |
| WO | 2015079564 A1 | 6/2015 |
| WO | WO-2015173274 A1 * 11/2015 | .......... G06F 11/3024 |

OTHER PUBLICATIONS

International Search Report and Written Opinion for PCT Patent App. No. PCT/FR2016/051861 (dated Nov. 17, 2016), with English language translation of ISR.

Mar. 31, 2020 Notice of Reasons for Refusal issued in corresponding Japanese Patent Application No. JP2018530035A (with English abstract).

* cited by examiner

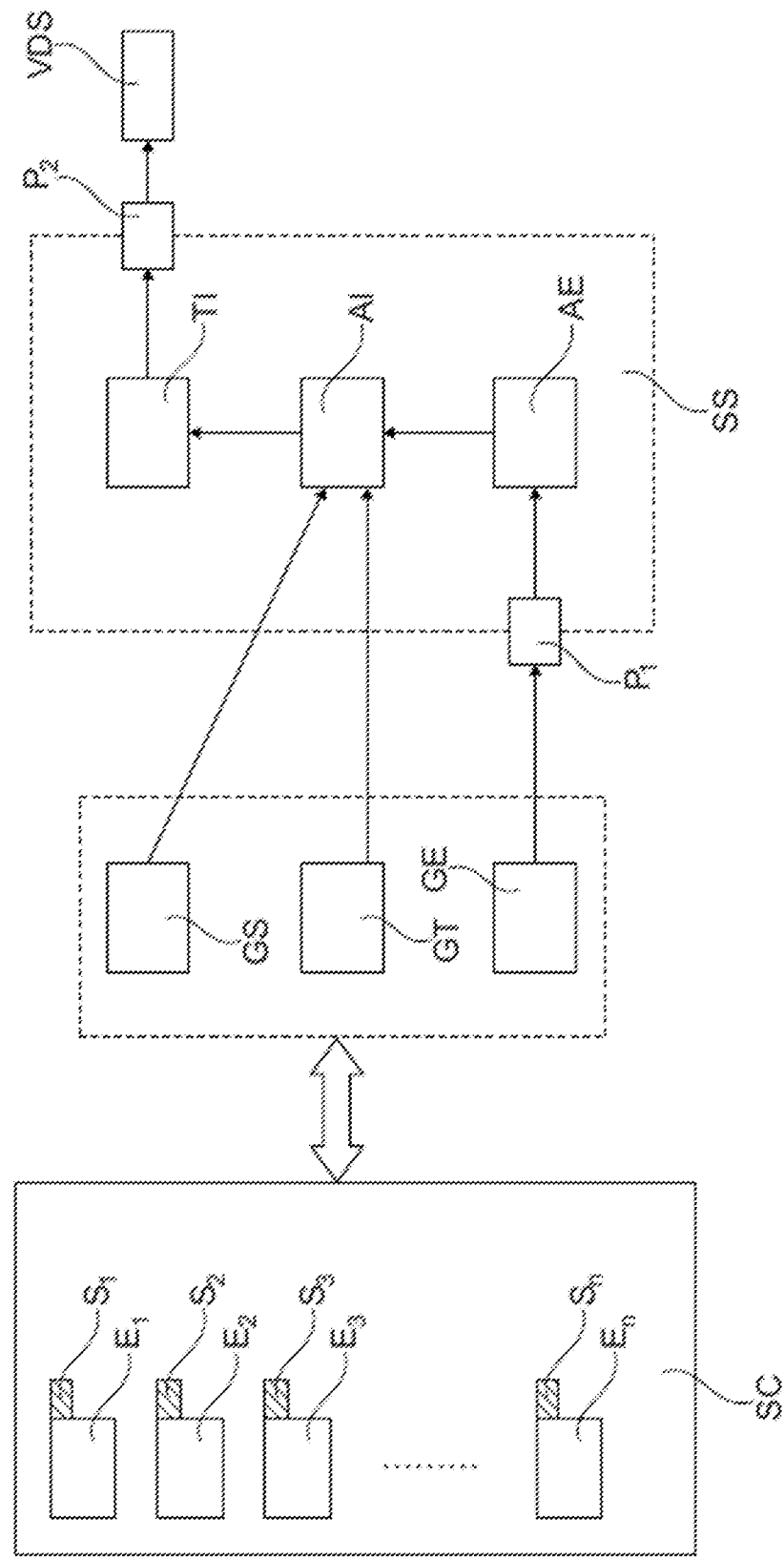

MONITORING SYSTEM FOR SUPERCOMPUTER USING TOPOLOGICAL DATA

CROSS REFERENCE TO RELATED APPLICATIONS

This application is a national phase filing under 35 C.F.R. § 371 of and claims priority to PCT Patent Application No. PCT/FR2016/051861, filed on Jul. 19, 2016, which claims the priority benefit under 35 U.S.C. § 119 of French Patent Application No. 1557708, filed on Aug. 13, 2015, the contents of each of which are hereby incorporated in their entireties by reference.

BACKGROUND

Some embodiments relate to the field of supercomputers. More specifically, some embodiments relate to the monitoring of such supercomputers.

A supercomputer is an information processing system intended to achieve the highest possible performance levels for processing information. Supercomputers are costly systems which have applications in specific fields: weather forecasting, molecular modeling, physical or mechanical simulations, computation in the nuclear field, etc. There are also applications in the field of finance, in the military domain, etc.

These supercomputers are, generally, made up of an interconnection of a very large number of equipment items. These equipment items include processing nodes (or microprocessors), routing nodes (or routers), management nodes, etc.

In recent years, supercomputers have achieved powers of the order of a peta-FLOPS (or PFLOPS), the FLOP (Floating Point Operations Per Second) being the measurement unit commonly accepted for assessing the power of a supercomputer. In order to achieve such power levels, these supercomputers can include several hundreds of thousands of interconnected equipment items.

The next generations of supercomputers are expected to achieve the exa-FLOPS, i.e. of the order of $10^{18}$ FLOPS. Such supercomputers should include several tens of millions of equipment items.

Management and monitoring systems have been created to allow an operator to detect supercomputer malfunctions, but also to be able to understand the causes of a malfunction and thus be able to remedy it.

Probes are associated with the equipment items in order to collect operation data, generally in the form of counters. These operation data can in particular be representative of a status (error rate, etc.) or of the tasks currently running.

The values from these probes or counters can be made available to a monitoring device, allowing an operator to view them. Conventionally, the task of the operator of a supercomputer consists in navigating around the available data to determine the problems or seek the causes of problems.

Since the number of probes is significant, this task becomes very complex, even impossible if the operator wants to be able to react rapidly to a problem.

Viewing tools have been developed, like the Graphite tool for example. This tool offers a web type interface making it possible to navigate around all the values from the probes. Graphite also makes it possible to organize the probes in the form of a tree structure in order to facilitate the access thereto and to apply functions to the values uploaded.

However, while such a tool allows for a graphic view, via a web interface, it does not make it possible to determine which are the probes to monitor to determine any problems.

It is also possible to define a relevant subset of probes whose values are viewed, and updated, on a graphical interface, or dashboard. The monitoring of the values from the probes of this subset is then assumed sufficient to determine the state, at a given instant, of the supercomputer and detect the problems and/or determine the cause thereof.

However, the task of determining this therefore devolves to a human operator. Now, in the case of a supercomputer of significant size, this task consists in making a selection from an extremely large number of available probes. This number can be as high as several tens of millions of probes or counters.

It follows therefrom that this task is extremely complex for a human operator, and that it is almost impossible to define an optimal relevant subset.

Furthermore, another problem that the operator might face is the heterogeneity of the devices supplying the information to be analyzed. In effect, in addition to the probes and counters, the supercomputer can also be associated with or include management and monitoring tools of various kinds. These tools can make it possible to obtain a view according to a particular criterion for example, or else be incorporated in or associated with a particular equipment item of the supercomputer.

To analyze the state of the supercomputer, the operator must or should therefore be able to interact with the various tools, and, here again, select the information that is needed for the monitoring task.

Consequently, the increasing power and complexity of supercomputers is raising at least two technical problems:
on the one hand, it is becoming increasingly complex to perform monitoring according to the related art methodology;
on the other hand, the monitoring has become a more critical problem, because the increase in the complexity of the supercomputer architectures multiplies the potential sources of problems that can impact them.

SUMMARY

The aim of some embodiments is to provide a method and a system that at least partially mitigates the abovementioned drawbacks, and that in particular makes it possible to enhance or resolve this dual technical problem.

To this end, some embodiments propose a method for monitoring a supercomputer architecture including a plurality of equipment items, the method including:
a step of reception of an event relating to probes associated with the equipment items;
a step of determination of information on at least one equipment item based on data contained in the event;
an aggregation step consisting in determining second information items from the information on at least one equipment item, and based on data on the topology of the supercomputer architecture;
a step of transmission of the second information items to at least one supervision data viewing tool.

Some embodiments include one or more of the following features which can be used separately or in partial combination with one another or in total combination with one another:
the second information items are determined from a set of equipment items determined from the information items and from the topology data;

the second information items are determined also from data from probes associated with the set of equipment items;

the second information items are transmitted to a web service.

Another aspect of some embodiments relates to a computer program including software means suitable for implementing the method as described previously, when triggered by an information processing platform.

Another aspect of some embodiments relates to a monitoring system for monitoring a supercomputer architecture including a plurality of equipment items, the monitoring system including:

an event analysis module suitable for receiving an event relating to probes associated with the equipment items and for determining information on at least one equipment item based on data contained in the event;

an information aggregation module suitable for determining second information items from the information on at least one equipment item, and based on data on the topology of the supercomputer architecture;

an information transmission module, suitable for transmitting the second information items to at least one supervision data viewing tool.

According to advantageous or preferred embodiments, the presently discussed subject matter include one or more of the following features which can be used separately or in partial combination with one another or in total combination with one another:

the information aggregation module is suitable for determining the second information items from a set of equipment items determined from the information items and from the data on the topology;

the second information items are determined also from data from probes associated with the set of equipment items;

the data on the topology are supplied by a topology manager.

Another aspect of some embodiments relates to a system including a monitoring system as described previously and a supercomputer.

Other features and advantages of some embodiments of the presently disclosed subject matter will become apparent on reading the following description of some embodiments, given as an example and with reference to the attached drawings.

BRIEF DESCRIPTION OF THE DRAWINGS

The FIGURE schematically represents an exemplary architecture including a supercomputer and a monitoring system, according to some embodiments.

DETAILED DESCRIPTION OF THE EMBODIMENTS

In the FIGURE, a global context is represented in which an embodiment is implemented. This context is considered to be fairly general, but other embodiments can also be implemented, possibly not falling within the framework of this illustrative context.

A supercomputer SC includes a plurality of equipment items E1, E2, E3 . . . En. Some embodiments apply to high power supercomputers, therefore including a large number of equipment items. This number can therefore be of the order of several hundreds of thousands, even several millions of equipment items.

The equipment items can be processing nodes, including one or more microprocessors, a set of memories, etc., intended to perform the actual processing tasks entrusted to the supercomputer.

The equipment items can also be routing nodes, making it possible to route data appropriately within the supercomputer.

There can also be management nodes, making it possible to manage this routing and the distribution of a task within the set of processing nodes.

These equipment items are interconnected and therefore form a network according to a topology that is determined in advance, and even adaptable.

In this way, the processing tasks entrusted to the supercomputer SC can be processed on a set of processing nodes according to different modes of operation (massive parallelism, pipeline, etc.).

Probes S1, S2, S3 . . . Sn are also deployed within the supercomputer.

These probes are associated with the equipment items. Different configurations are possible: a probe can be associated with a single equipment item, or else with several equipment items; a given equipment item can be associated with a single probe, or else with several probes. Thus, the FIGURE illustrates a typical embodiment in which a 1-1 relationship is put in place between the probes and the equipment items, but, more generally, N-M relationships can possibly be put in place between probes and equipment items that make up the supercomputer SC.

The term "probe" is used here to mean any entity that makes it possible to measure information on the operation or the state of one or more equipment items and to communicate the information outside of the supercomputer. A probe can therefore be a software module incorporated in the associated equipment item, or else a hardware apparatus, or even a combination of the two.

A probe can be a simple counter, which measures in real time a quantity linked to the associated equipment item: an error rate, a temperature, a load, etc.

Some equipment items can be associated with more sophisticated management and/or monitoring systems which can supply information of more complex nature. In as much as some embodiments can be applied both to the simplest and most basic counters and to the most sophisticated management systems, the two categories, and the intermediate solutions, are grouped together hereinbelow in the text under the term "probe".

The management tools of a supercomputer generally include: an event 30 generator GE, a topology manager GT, and a probe manager GS.

The event generator GE operates in collaboration with the various probes S1, S2, S3 . . . Sn in order to generate an event, or notification, when the values taken by one or more probes correspond to determined criteria. The events generated by the event generator GE are triggered by the values taken by 5 the probes S1, S2, S3 . . . Sn. Events can also be triggered by the human operator, concerning certain equipment items and/or probes.

Primarily, two types of sources can generate events from an equipment item:

a hardware failure or degradation (port failure, power supply problem, defective cable, etc.);

excessively numerous and repetitive errors during a defined time interval.

Very often, the user can trigger the action, via an event, because he or she wants to look up and display certain counters of certain equipment items.

A topology manager GT is also available in order to store the topology of the supercomputer architecture, that is to say the identity of the equipment items and their interconnections. Thus, by interrogating the topology manager, it is possible, at any moment, to ascertain how the equipment items are connected to one another and therefore, for a given equipment item, which are its "topological neighbors", that is to say those to which they are connected (physically or logically).

The supercomputer SC can also be associated with a probe manager GS. This device makes it possible to ensure an interface to the probes S1, S2, S3 . . . Sn and to a third-party application to be able to access their values, by means of a determined protocol.

The probe manager GS, the topology manager GT and the event generator GE can be specific to the supercomputer. Their functionalities and their modes of use can therefore vary strongly from one manufacturer to another. Generally, they can be devices of the related art, which, as has been stated previously, cannot directly allow an organized display of the relevant information items, as proposed by some embodiments.

Some embodiments lie in the monitoring system SS which takes as input the information items supplied by the event generator GE, by the topology manager GT and by the probe manager GS. The monitoring system SS can possibly directly access the probes S1, S2, S3 . . . Sn, according to some embodiments.

The monitoring system according to some embodiments includes an event analysis module AE, an information aggregation module AI and an information transmission module TI. These modules are functional modules: physically, they can be implemented by distinct devices, in particular separate software applications, or else by a single device, or software application, combining these three functions in forms that may or may not be independent. The division into three functional modules allows for a clearer explanation of the mechanisms of some embodiments and will be retained hereinbelow.

The event analysis module makes it possible to receive the events generated by the event generator GE. On the reception of an event, the event analysis AE reads the data contained in this event.

According to some embodiments, an adapter can be inserted between the event generator GE and the event analysis module AE in order to translate the data supplied by the events into a format that is comprehensible to the event analysis module AE. This adapter can take the form of an independent module or plug-in P1. A plug-in can be designed for each type of event generator GE. Thus, for each supercomputer manufacturer having its own management tools and in particular an event manager GE, it is possible to design a plug-in module P1 suitable for transforming the events generated and their data into a "universal" format suited to the monitoring system SS.

From these data extracted from the received event, the event analysis module determines information on the equipment item or items concerned. This or these equipment item or items is/are typically those originating the event. Such information can include an identifier of the equipment item, and information originating from the probe or probes associated with the equipment item. The latter information can contain a probe identifier (representative of what is measured), a value, and a unit.

For example, if an event is triggered by a threshold crossed by a counter S1 associated with an equipment item E1, the event analysis module can retrieve as information, the identifier (or name) of the equipment item E1, an identifier of the probe S1 and/or an identifier of the quantity measured by the probe (for example, an error rate, a load, an electrical consumption, etc.), a value and a unit.

Such information can then be formatted in a determined format and transmitted to the information aggregation module AI. The aim of this module is to aggregate the information transmitted by the event analysis module AE.

This step implemented by the aggregation module can consist in aggregating this information from the events, with data on the topology of the supercomputer SC architecture. These topology data (or topological data) SC can originate from the topology manager GT.

Thus, the information received via an event can contain a first set of equipment items. This first set can be a singleton, if the event concerns only a single equipment item Ei.

This first set is "projected" into the topology of the architecture in order to determine a second set, encompassing this first set and neighboring equipment items. The concept of neighbor can depend on a distance for example, thus making it possible to define an interest in the immediate neighbors only, or else in neighbors situated at N hops from the equipment items of the first set.

This projection and the determination of this second set can be made by addressing requests to the topology manager GT in order to upload to the information aggregation module the neighbors of each equipment item of the first set, and then make a set union of it.

The information aggregation module can then search for the values supplied by probes associated with the equipment items of this second set. For this, it can interrogate the probe manager GS.

Based on the probe values, it can then retain only a part of the equipment items and set aside the others.

For example, it can retain only the equipment items having probes that are homogeneous with the equipment item or items relating to the event. Thus, if an event concerns a problem relating to an excessive load, it may be pointless to consider an equipment item, even a neighbor, for which only a probe for electrical consumption is available. By contrast, information on the routing may be relevant, in order to determine the cause and the consequences of this problem.

Other filtering mechanisms can be put in place to determine this second set of equipment items, and a set of associated probes and of probe values.

For example, rule or learning mechanisms can be put in place to correlate events and patterns of correlated equipment items/probes. For example, rules or learning mechanisms can provide second typical sets of equipment items or rules for determining them.

In this way, the information aggregation module can determine second information items, constructed from
information items determined by the event or events received, and
from data on the topology of the architecture of the supercomputer, and,
possibly from data from probes associated with equipment items of a set determined from data on the topology.

Generally, it is thus possible to determine, if necessary, the equipment items that might be of interest to watch, in addition to the initial ones.

For example, if an equipment item uploads an excessive temperature problem, it may be interesting to have its temperature curve as well as those of its near neighbors, in order to check whether there is a more global problem (air conditioning failure for example).

The duly determined second information items can be transmitted to an information transmission module TI. The aim of this functional module is to format, to structure, the second information items, and to offer one or more interfaces allowing supervision data viewing tools VDS to access the second information items.

Different tools can thus collect the available information by interfacing with the information transmission module TI of the monitoring system SS according to some embodiments.

In order to allow increased interoperability, a translation unit P2, of plug-in type, can be inserted downstream of the information transmission module TI, in order to adapt the second information items to any imaginable format.

It can thus be possible to propose an exporting of the information not only to actual monitoring data viewing tools VDS, but also by web services (via, for example, a representation in XML, metalanguage), etc.

Thus, some embodiments allow for an easier and more automatic configuration of the supervision data viewing tools. This configuration can be adapted to the context, that is to say to the events received.

In particular, it makes it possible both to limit the information transmitted to a relevant subset according to the context, and also to enrich it with other relevant information. The monitoring system according to some embodiments uses the topological data to do so, which allows it to enrich the information and to determine the most relevant information.

The concept of relevance can
be the subject of parameterization and of learning mechanisms, thus allowing the monitoring system to achieve significant performance levels.

Consequently, the operator can react to the events transmitted by the supercomputer, or simply proceed with monitoring operations on its own initiative, more rapidly and effectively. It will be able to more rapidly detect and comprehend a problem occurring on the supercomputer, and also determine a possible cause thereof.

Obviously, some embodiments are not limited to the examples described and represented, but they lend themselves to numerous variants accessible to the person of ordinary skill in the art.

The invention claimed is:
1. A method for monitoring a supercomputer architecture comprising a plurality of equipment items, the plurality of equipment items including a first set of equipment items and a second set of equipment items, the method comprising:
receiving events from a plurality of probes, each probe associated with at least one of the first set of equipment items, the plurality of probes comprising a first probe associated with a first equipment item and a second probe associated with a second equipment item;
determining first information based on data contained in an event from the first probe, wherein the first information comprises information related to a microprocessor, the microprocessor being an equipment of the first set of equipment items;
determining a second set of equipment items of the plurality of equipment items, the second set of equipment items including the first set of equipment items and an additional set of equipment items neighboring the first set of equipment items, the additional set of equipment neighboring the first set of equipment is determined based on data on a topology of the supercomputer architecture, the topology of the supercomputer architecture including an identity of each equipment item of the supercomputer and the interconnections of each of the plurality of equipment item of the supercomputer;
searching for values of probes associated with the second set of equipment items;
determining second information by aggregating the first information, the topology of the supercomputer architecture, and the values of probes associated with the second set of equipment items excluding the microprocessor; and
transmitting the second information to at least one supervision data viewing tool.
2. The method as claimed in claim 1, wherein the second information is transmitted to a web service.
3. A non-transient computer-readable medium having stored thereon software instructions that, when executed by a processor, cause the processor to implement the method as claimed in claim 2.
4. A non-transient computer-readable medium having stored thereon software instructions that, when executed by a processor, cause the processor to execute the method as claimed in claim 1.

* * * * *